Feb. 27, 1968  E. E. BEYERS  3,370,547
CARRIER TRANSFER DEVICE FOR CONVEYORS
Filed March 15, 1966  2 Sheets-Sheet 1

INVENTOR
EUGENE E. BEYERS
BY Farley, Forster
and Farley
ATTORNEYS

*INVENTOR*
EUGENE E. BEYERS
BY Farley Forster
and Farley

*ATTORNEYS*

United States Patent Office 3,370,547
Patented Feb. 27, 1968

3,370,547
CARRIER TRANSFER DEVICE FOR CONVEYORS
Eugene E. Beyers, Atlanta, Ga., assignor to Jervis B.
Webb Company, a corporation of Michigan
Filed Mar. 15, 1966, Ser. No. 534,522
11 Claims. (Cl. 104—172)

This invention relates to a carrier transfer device for conveyor lines employing a floating spider arm transfer member for use in transferring a carrier from a forwarding conveyor line to receiving line.

The primary purpose of this transfer device is to provide a positive transfer from a forwarding drive chain to an unsynchronized receiving drive chain in a manner that eliminates the possibility of interference causing a jam between an arm of the transfer member and the tow pin or drive dog of the carrier being transferred.

It is also desired that this transfer device shall be self-movable to a non-interfering or non-jamming position in response to forces produced by any improper engagement between an arm of the transfer member and a carrier to be transferred; and, shall have self-restoring movement to a normal driving position in response to the forces accompanying a proper engagement between an arm of the transfer member and the carrier.

The transfer device of the invention for positively driving a carrier along a connecting path between forwarding and receiving conveyor lines, includes a rotatable driver, a spider having a plurality of drive arms each provided with a drive surface adapted in normal operation to intercept the connecting path and engage a carrier thereon, driving means between the driver and spider accommodating radial displacement of the spider from a normal centered position relative to the axis of rotation of the driver to a by-pass position in the event of an interfering engagement between a drive arm of the spider and a carrier, such displacement moving a succeeding drive arm of the spider to a position extending radially beyond its normal position, and cam means for restoring the spider to its normal position.

In the preferred construction to be discussed in more detail herein, the spider floats with a sliding engagement upon the face of the driver, and the driving means between the driver and spider include three interengaging drive pins and cam surfaces symmetrically arranged with respect to the axis of rotation of the driver with the cam surfaces extending radially and substantially parallel to the drive surface on each of the spider drive arms so that the reactions accompanying a proper normal engagement between a drive arm and a carrier produces a force couple which restores the spider to a normal centered position, if displaced therefrom, in which the reaction forces are resisted by the engagement of all three pin and cam surfaces.

In the event of an interference arising from improper engagement of a spider arm and carrier the resulting angular force and radial components thereof the spider arm will displace the spider on the driver from normal centered position the required distance to allow the arm to by-pass without damage. This causes a succeeding arm to be extended an additional amount more than sufficient to engage and propel the carrier through the transfer, the reaction force from the proper drive engagement causing the spider return itself to centered position.

Hence this construction operates solely through drive reactions to relieve an interference condition without jamming, then automatically repositions itself without dependence upon springs or other mechanical devices.

These and other objects will best be understood from the following detailed description of a preferred embodiment with reference to the drawings disclosing same wherein.

Figure 1:
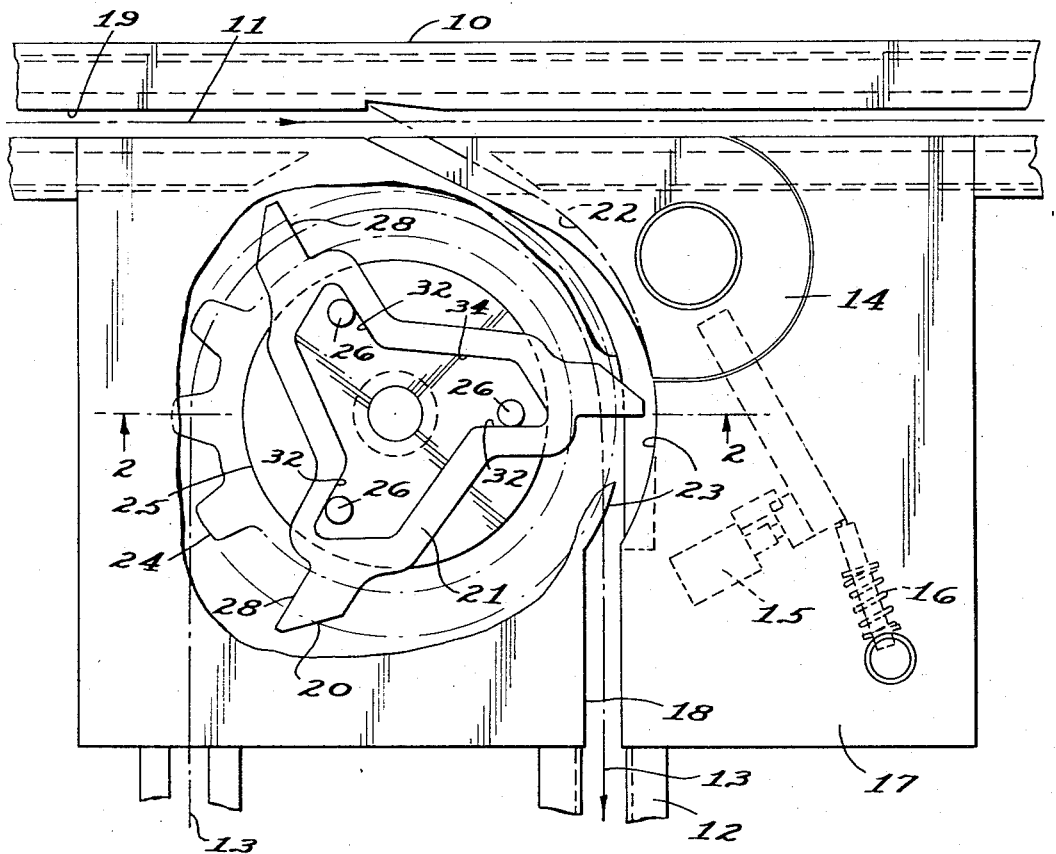
FIGURE 1 is a plan view of a typical floor truck tow line transfer junction employing the present spider arm transfer mechanism.

Referring to FIG. 1, a main sub-floor track 10 is provided for a main drive chain schematically represented by the center line 11 and a branch track 12 is provided for a drive chain schematically represented by the center line 13. A diverter arm 14 is selectively actuated from the full line position shown to a diverting position indicated by dotted line through a electrically operable solenoid 15 and over-center spring plunger 16 respectively anchored to the floor plate 17, having a branch guide slot 18 for the tow pin of a floor truck to be transferred from a similar guide slot 19 above and parallel to the main track 10.

Conventional pusher means, not shown, on the main chain 11 for propelling the tow pin of a floor truck along the main guide slot 19, in cooperation with the diverter arm 14, is capable of moving such tow pin to a pick-up position for engagement by one of the three drive arm extensions 20 of a transfer spider 21 in its normal central driving position as shown whereupon such pin will be propelled along the guide slot formed by the arcuate guide surface 22 of the diverter arm and arcuate guide surfaces 23 in the floor plate which form a connecting path or entrance to the branch guide slot 18. Conventional branch line pushers powered by the branch drive chain 13 may be provided to further engage and propel the floor truck tow pin along the branch guide slot. Suitable drive units, not shown, independently and non-synchronously propel the main and branch drive chains.

Figure 2:
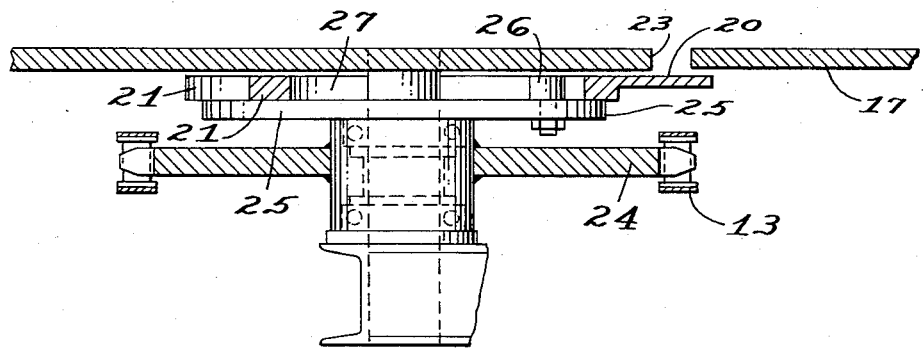
FIGURE 2 is a sectional elevation taken along the line 2—2 of FIG. 1.

With reference to FIG. 2, the sprocket 24 driven by the branch chain 13 is fastened to and in turn drives an annular plate 25 upon which three equilaterally spaced drive pins 26 are secured. The spider 21 comprises a plate slidably resting on the driver plate 25 and having an open center 27 with radially extending cam surfaces 32 engageable by the respective drive pins 26. The location and configuration of the respective cam surfaces is such that it is possible for all three drive pins to have simultaneous engagement therewith as shown in FIG. 1 only when the spider is centered on the driver 25.

It is apparent that any off-center displacement of the spider will result in relative displacement between at least one drive pin and adjacent cam surface of the spider. It is also apparent that a circumferential force applied normally to any of the drive faces 28 of the spider arms 20 will maintain the spider locked in central position in engagement with all drive pins since the spider is otherwise unstable relative to such normal force. However, if a radial or angular end loading is applied to one of the arm 20, off-center displacement of the spider to relieve such loading will result, being permitted by the radial clearance and camming action between the spider and drive pins.

Figure 3:
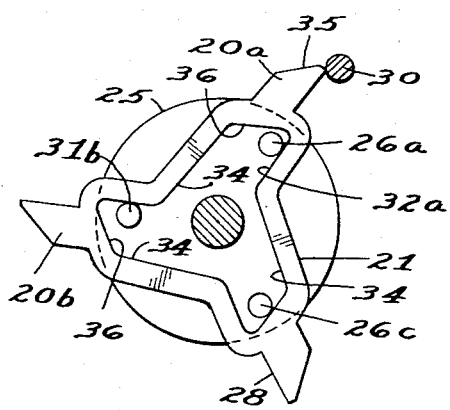
FIGURES 3, 4 and 5 are plan views of the spider in respective positions of initial displacement, by-pass and return toward drive relationship upon encountering an interference and avoiding a jammed relationship.
Figure 4:
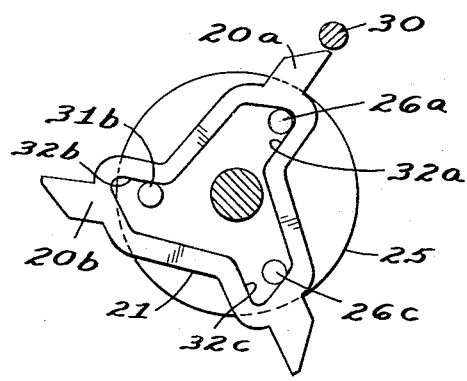
Figure 5:
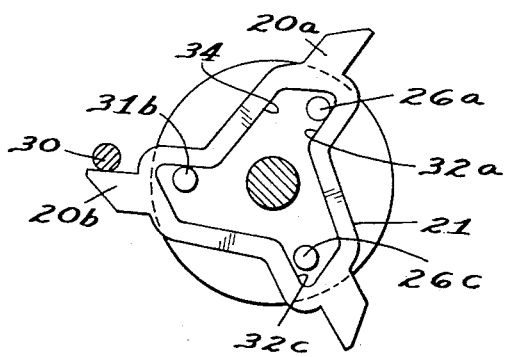

Thus, if due to the unsynchronized drive condition and a mischance arrival of a floor truck tow pin 30 at an interference or incipient jamming position with one of the arms 20a, the displacement of the spider in a direction relieving interference will result as illustrated in FIG. 3 until the spider drive arm 20a reaches a clearance position as shown in FIG. 4. The inward displacement of the interfering drive arm 20a relative to a floor truck tow pin 30 will cause the next drive arm 20b to project radially outward beyond normal position where it will be certain to engage the tow pin 30 which will have arrived at a pickup position when overtaken by the drive arm 20b. Upon engagement of the outwardly displaced drive arm 20b with the tow pin, exerting a force normal to the drive arm 20b, an unstable condition will exist due to the clearance between the drive pin 26c and adjacent cam surface 32c of the spider causing the spider to fulcrum around the drive engagement point 31b in response to which the reaction of cam surface 32a on drive pin 26a will draw the spider arm toward a central position as illustrated in FIG. 5 such movement continuing until drive pin 26c fully engages adjacent cam surface 32c upon the spider becoming centralized on the driver plate 25.

In the construction illustrated, a carrier is forwarded by the main drive chain 11 to the junction where the branch drive chain 13 receives a diverted carrier from the spider transfer device; hence the drive chain 11 may be termed the forwarding chain, the drive chain 13 the receiving chain and the spider transfer device is driven from the latter. Obviously this construction could be rearranged so that the drive chain 13 would act as a forwarding chain and the drive chain 11 as the receiving chain; and thus, power for rotating the spider 21 and driver plate 25 can be obtained from either the forwarding or receiving drive chains.

The unsynchronized relation of the forwarding and receiving drive chains previously mentioned encompasses both a lack of synchronization with respect to relative speed and with respect to relative position of the carrier engaging pushers on the two chains. In the case of a speed difference between the two chains and particularly where the forwarding chain is the faster, it is possible for a jamming condition to arise from a carrier overtaking one of the drive arms of the spider. Then, circumferential clearance between the spider cam surfaces 32 and retainer surfaces 34 (FIG. 3) provide lost motion for the spider to rotate forwardly relative to the driver plate 25 and the tapered end surfaces 35 on the drive arms 20 will tend to produce inward off-center movement of the spider on the driver plate 25 as permitted by the clearance or lost motion provided between the drive pins 26 and the radial retainer surfaces 36 of the spider. The spider will be restored to proper centered position as a result of engagement between the next following drive arm 20 and the carrier as before.

Thus, it will be seen by providing the proper configuration of cam surfaces relative to equilaterally spaced drive pins together with lost motion clearance for displacement responsive to abnormal forces, the jam-relieving and self-centering actions have been provided which are entirely responsive to interference and normal driving forces without the necessity for any auxiliary mechanisms, spring loadings or other relatively more expensive and complicated devices.

While a preferred embodiment of the present invention applied to a floor conveyor transfer junction has been illustrated and described above in detail, it will be understood that it is equally applicable to the transfer junctions of overhead power and free conveyors and that numerous modifications may be resorted to without departing from the scope of the invention as defined in the following claims.

I claim:

1. A transfer device for effecting a positive drive transfer of a carrier between forwarding and receiving conveyor lines wherein the carrier is diverted from the main conveyor line into a connecting path to the branch line, including a rotatable driver, a spider having a plurality of drive arms each provided with a drive surface adapted in normal operation to intercept the connecting path and engage a diverted carrier, driving means between said driver and spider accommodating radial displacement of said spider from a normal centered position relative to the axis of rotation of the driver to a by-pass position in the event of an interfering engagement of a carrier and drive arm, said displacement moving a succeeding drive arm of said spider to a position extending radially beyond its normal intercept position, and cam means for restoring said spider to its normal position.

2. A transfer device as set forth in claim 1 further characterized by said cam means employing drive reaction forces from engagement of said succeeding drive arm with a carrier for restoring said spider to its normal position.

3. A transfer device as set forth in claim 1 wherein the driving means between said driver and spider includes lost motion pin and cam means which comprises the means for restoring said spider to its normal position.

4. A transfer device as set forth in claim 1 wherein said spider incorporates three drive arms, one of which moves radially outwardly when another of which moves to a by-pass position.

5. A transfer device as set forth in claim 1 wherein the driving means between said driver and spider include three interengaging drive pins and cam surfaces symmetrically arranged with respect to the axis of rotation of the driver.

6. A transfer device as set forth in claim 5 wherein each of said cam surfaces extends in a substantially radial direction, each drive pin and cam surface being closely associated with one of said drive arms and the pin and cam engagement being radially inward of the drive surface of the corresponding arm.

7. A transfer device as set forth in claim 6 wherein the drive surface of each of said drive arms also extends in a substantially radial direction whereby the drive reaction on a drive arm together with the drive reaction between said associated pin and cam surfaces exert a substantially parallel force couple on said spider, rendering it unstable except when in normal, centered position at which time each of the other pin and cam surfaces are in engagement and resist said force couple.

8. A transfer device as set forth in claim 1 further including means driven by one of said conveyor lines for rotating said driver.

9. A transfer device as set forth in claim 1 wherein an arcuate guide track is provided establishing a connecting path of carrier travel between the forwarding and receiving conveyor lines.

10. A transfer device as set forth in claim 1 wherein the driving means between the driver and spider members include three interengaging drive pins and cam surfaces symmetrically arranged with respect to the axis of rotation of the driver, the drive pins being mounted on one of the driver and spider members and the cam surfaces being provided on the other of said members.

11. A transfer device as set forth in claim 10 wherein the spider is further provided with retainer surfaces extending generally circumferentially and radially with respect to the axis of rotation of the driver, said retainer surfaces being in clearance relation with the drive pins when the spider is in said normal center position on the driver to provide lost motion between the spider and driver in radial and circumferential directions relative to said axis.

No references cited.

ARTHUR L. LA POINT, *Primary Examiner.*

D. F. WORTH, *Assistant Examiner.*